(12) United States Patent
Qi et al.

(10) Patent No.: US 7,592,784 B2
(45) Date of Patent: Sep. 22, 2009

(54) POWER MANAGER FOR AN ELECTRICAL POWER GENERATOR

(75) Inventors: Wei Wei Qi, New Berlin, WI (US); Michael Rubbo, Muskego, WI (US); Richard Wainwright, Grand Rapids, MI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 12/237,244

(22) Filed: Sep. 24, 2008

(65) Prior Publication Data
US 2009/0045783 A1     Feb. 19, 2009

Related U.S. Application Data

(62) Division of application No. 11/156,216, filed on Jun. 17, 2005, now Pat. No. 7,486,053.

(51) Int. Cl.
*H02P 9/04* (2006.01)
(52) U.S. Cl. ............... 322/24; 322/18; 322/20; 322/45; 290/40 C
(58) Field of Classification Search ........... 322/24, 322/25, 27, 18, 20, 45; 290/40 C
See application file for complete search history.

(56) References Cited

U.S. PATENT DOCUMENTS

| | | | |
|---|---|---|---|
| 3,891,915 A | 6/1975 | Yannone et al. | |
| 4,280,060 A | 7/1981 | Kure-Jensen et al. | |
| 4,536,126 A | 8/1985 | Reuther | |
| 4,749,944 A * | 6/1988 | Okamoto | 324/772 |
| 5,285,147 A * | 2/1994 | Rashid | 322/28 |
| 5,929,612 A | 7/1999 | Eisenhaure et al. | |
| 6,034,855 A | 3/2000 | Bishop | |
| 6,586,914 B2 * | 7/2003 | Garrigan et al. | 322/28 |
| 6,587,737 B2 | 7/2003 | Voser et al. | |
| 6,792,338 B2 | 9/2004 | Johnson | |
| 7,042,210 B2 | 5/2006 | Matsukawa et al. | |
| 2005/0116814 A1 | 6/2005 | Rodgers et al. | |

FOREIGN PATENT DOCUMENTS

WO     0013287     3/2000

* cited by examiner

*Primary Examiner*—Nicholas Ponomarenko
*Assistant Examiner*—Iraj A Mohandesi
(74) *Attorney, Agent, or Firm*—Kinney & Lange, P.A.

(57) ABSTRACT

An electrical power generator includes a controller for making a full power capacity of the generator available for consumption by at least one intelligent load coupled to an output of the generator. The controller obtains data from which both a present output power of the generator and a power capacity of the generator can be determined. The controller then provides the intelligent load with data indicative of both the present output power and the power capacity of the generator for use by the load in controlling its power consumption.

9 Claims, 2 Drawing Sheets

POWER MANAGER FOR AN ELECTRICAL POWER GENERATOR

CROSS-REFERENCE TO RELATED APPLICATION(S)

This application is a divisional of application Ser. No. 11/156,216, filed Jun. 17, 2005 and entitled "Power Manager for an Electrical Power Generator" by Wei Wei Qi, Michael Rubbo and Richard Wainwright.

Reference is hereby made to U.S. Pat. No. 7,272,514 entitled "Protection System for an Electrical Power Generator" of Wei Wei Qi, Michael Rubbo, and Richard Wainwright. This application is hereby incorporated by reference as set forth fully herein.

BACKGROUND

The present invention relates generally to electrical power generation systems, and more particularly to an electrical power generator having self-monitoring capabilities that cooperate with at least one intelligent load to safely utilize traditionally untapped power generating capabilities of the generator.

Electrical generators are used in a wide variety of dedicated electrical system applications and locations that require power independent of a standard electrical grid. Commonly, electrical generators are the primary, if not only, source of electrical power on a vehicle or ship, or in a remote location such as on an oil platform, in a small town, on an island or along a pipeline. Electrical generators are also commonly used as a backup power source in locations operating primarily off the standard electrical grid.

Because of this primary role served by electrical generators, it is often desired to keep the generator fully functioning, or at least partially functioning, in all circumstances. Maintaining the generator at full capacity is complicated by the fact that the conventional generator is a slave to its loads, the maximum sum of which may greatly exceed a rated capacity of the generator. The generator itself cannot directly control its outputted power; it can only control its own output voltage. Rather, it is the generator's loads that control the draw of power from the generator. Thus, to avoid overloading conditions that may harm the generator, the conventional generator simply shuts itself off upon detection of overloading condition indicators, such as excessive temperature.

Generators typically have a rated continuous capacity that is determined as the maximum quantity of power the generator can produce for an indefinite amount of time without risking damage to the generator. Generators also have a rated surge capacity determined as a value the generator can sustain for a limited time, such as when the generator experiences a surge in power demands due to the transitioning of the generator's loads between on and off states.

The rated continuous and surge capacities are typically very conservative estimates of what the generator can actually handle. That is, most conventional generators can produce much more power than their ratings allow, and in use, much of the generator's power generating capacity is neglected. Nonetheless, to ensure their continuous operation, generators typically are selected to have a sufficient continuous capacity rating to handle all loads operating simultaneously at full capacity. This assumption often results in the selection of a larger capacity generator than what may otherwise be required or the addition of a second generator to allow a reduction in the load attached to the first generator. In many situations, however, these solutions are not appropriate due to cost, weight, size, and efficiency considerations. Thus, there exists a need for a generator capable of utilizing more of its capacity.

SUMMARY

The present invention is a system and a method for making a full power capacity of an electrical power generator available for consumption by at least one intelligent load coupled to an output of the generator. In accord with the present invention, data is obtained from which both a present output power of the generator and a power capacity of the generator can be determined. Data indicative of both present output power and the power capacity of the generator are provided to the intelligent load for use by the load in determining its power consumption.

DETAILED DESCRIPTION

Figure 1:
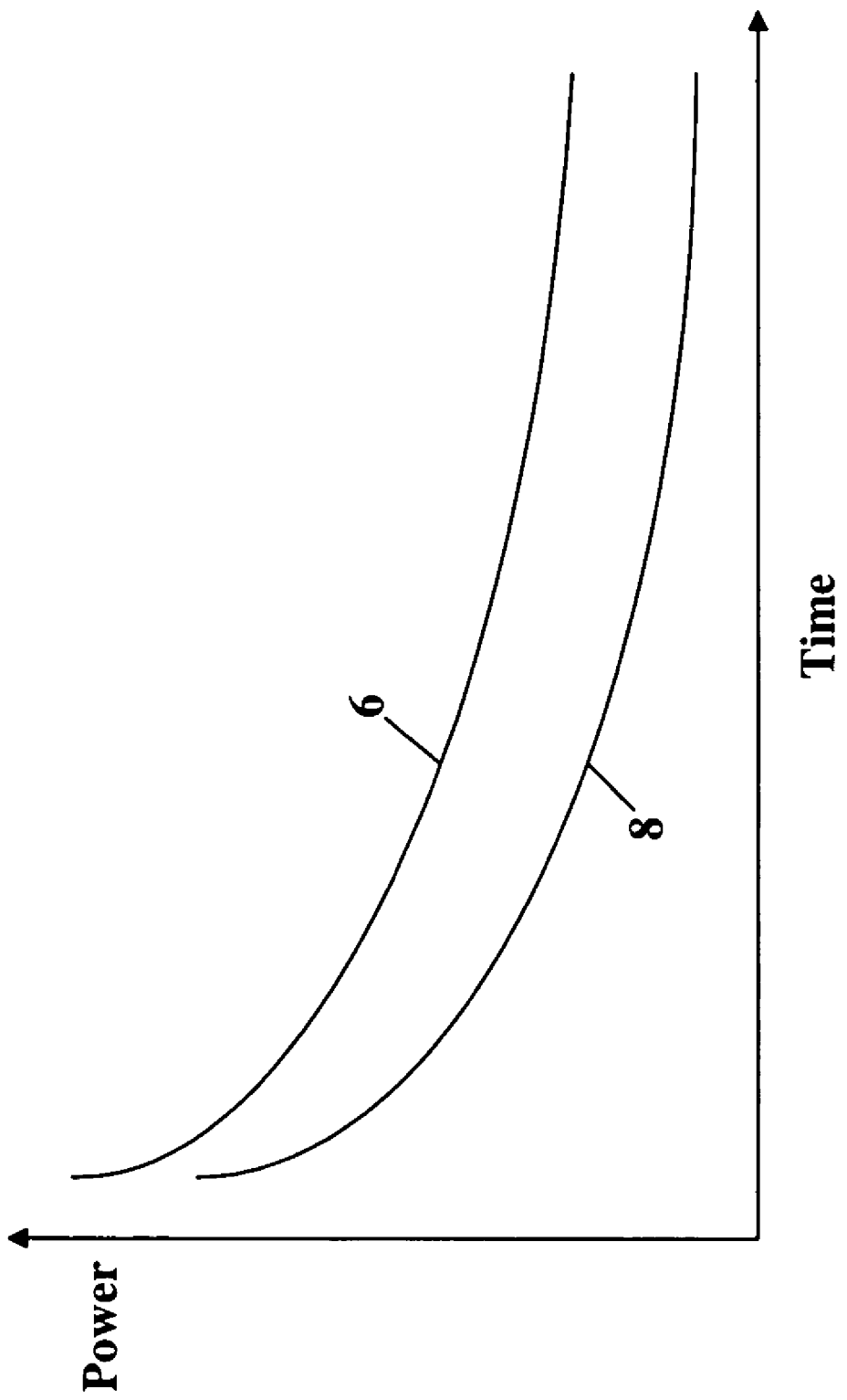
FIG. 1 is a graph of two power time relationships of a typical generator for illustrating a full power generating capacity of the generator.

The present invention is a generator that incorporates a power management system that, in contrast to prior art generators that simply limit the generator to its rated capacity, seeks to capture and utilize the full power capacity of a generator. FIG. 1 is a graph illustrating power-time relationships 6 and 8 of a typical generator for illustrating this full capacity of the generator. FIG. 1 plots a quantity of power produced by a generator as a function of time that the generator can sustain production of that quantity of power without risking damage to itself given existing system parameters of the generator, such as an ambient temperature, a temperature of various components of the generator, a rotational speed of the generator, and a frequency of the generator output. As the system parameters change, so too does the capacity of the generator. For example, as the generator's ambient temperature increases, the power capacity of the generator decreases. Thus, power-time relationships 6 and 8 shown in FIG. 1 exist for different system parameters, with power-time relationship 6 illustrating a capacity of the generator for a first set of system parameters (e.g., a low ambient temperature) and power-time relationship 8 illustrating the generator's capacity for a second set of system parameters (e.g., a high ambient temperature).

As shown in FIG. 1, the typical generator can produce a relatively high quantity of power; however, it can sustain this quantity for only a very short period of time. As the produced quantity of power decreases, the length of time that the generator can sustain this production increases. Eventually, the sustainable power levels off at a steady state value.

A rated continuous capacity and a rated surge capacity of a conventional generator are generally conservatively drawn from these power-time characteristics of the generator. That is, these rated values are typically determined from the generator's power-time relationship corresponding to a worse case scenario. The rated continuous capacity is generally determined as the steady-state value of the worse case scenario power-time relationship, while the rated surge capacity is determined as a multiple of the continuous capacity. The rated surge capacity may in fact be less than the actual maximum power the generator can produce.

Figure 2:
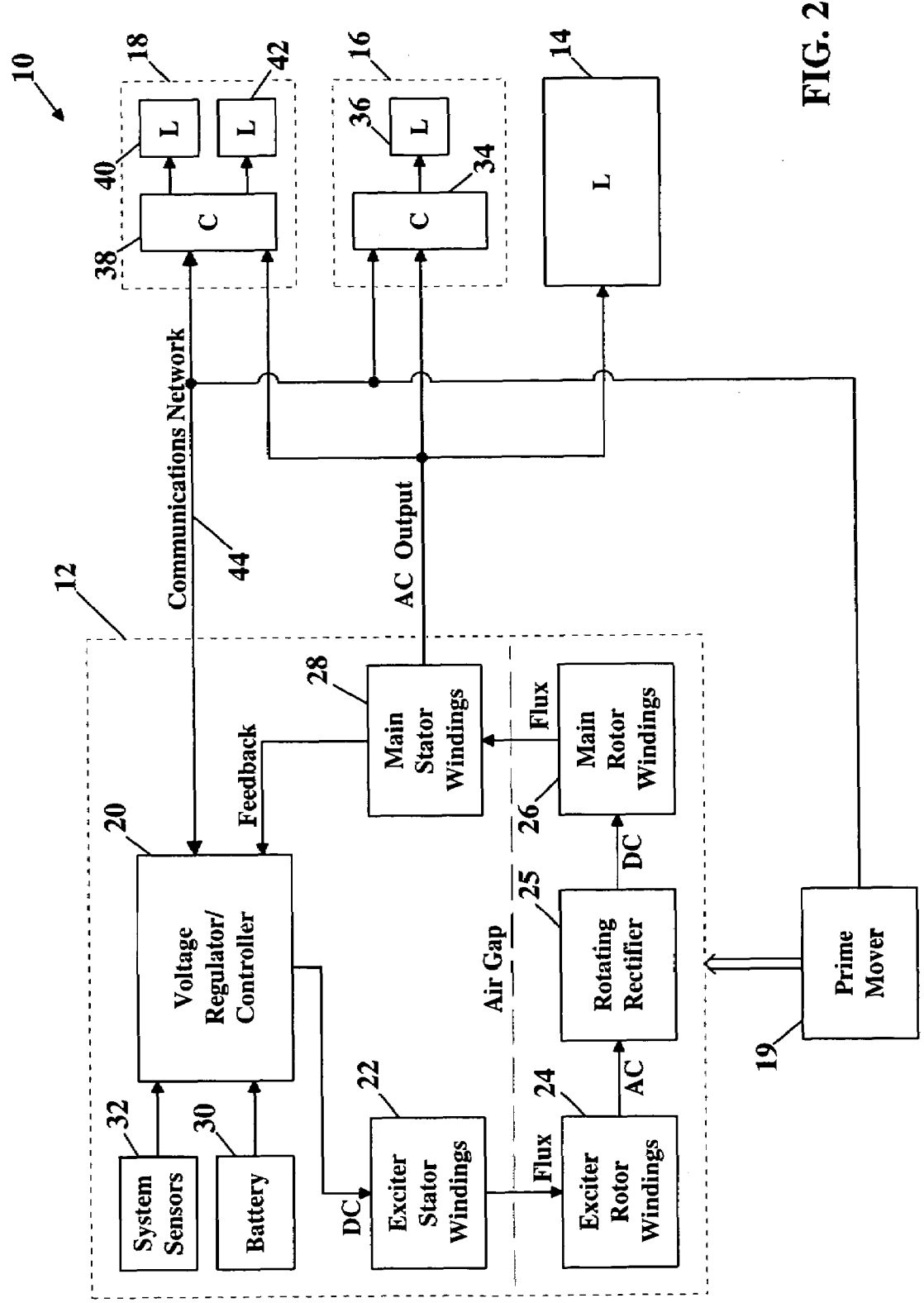
FIG. 2 is block diagram of an electrical system in accord with the present invention.

The present invention enables the generator to produce power over its full range of capacities, rather than simply limiting the generator to its rated continuous capacity. FIG. 2 is a block diagram of electrical system 10 in accord with the present invention. Electrical system 10 includes electrical power generator 12 for supplying power to any of a plurality of different types of loads. For illustrative purposes only, generator 12 is shown in FIG. 2 with three loads 14, 16, and 18.

As shown in FIG. 2, generator 12 is a brushless generator that converts the rotational energy generated by prime mover 19 into a multiphase alternating current (AC). The present invention, however, is not limited to only brushless generators, and other types of generators may be substituted for brushless generator 12. As is conventionally known, brushless generator 12 includes voltage regulator 20 (or controller or processor), an exciter having stator field windings 22 and rotor field windings 24, rotating rectifier 25, and a main generator having rotor field windings 26 and stator field windings 28. Exciter rotor field windings 24, rotating rectifier 25, and main generator field windings 26 share a rotor and are separated by an air gap from the stator having exciter stator field windings 22 and main generator stator field windings 28.

The conventional power generating operations of generator 12 are well known. In operation, voltage regulator 20 receives a direct current (DC) voltage from battery 30. Alternatively, battery 30 could be replaced with a permanent magnet generator or another source of DC voltage. Voltage regulator 20 supplies a first DC voltage to exciter stator field windings 22, which in turn develop a magnetic field. Exciter rotor field windings 24 are rotated in this magnetic field to produce a first multiphase AC voltage. The first AC voltage is then supplied to rotating rectifier 25, which rectifies the first AC voltage into a second DC voltage for supply to main generator rotor field windings 26. The current in main generator rotor field windings then generates a magnetic field which in turn produces a induces a multiphase AC power at an output of main generator stator windings 28. This AC power is supplied to loads 14, 16, and 18 of generator 12, and also as feedback to voltage regulator 20.

Voltage regulator 20 uses this feedback to help maintain a constant voltage at the output of generator 12, which may otherwise vary due to factors such as a variable rotational speed of the rotor of generator 12. Voltage regulator 20 accomplishes this goal by measuring the output voltage of generator 12 and adjusting a current provided to exciter stator windings 22 as needed in a closed-loop fashion.

Generator 12 improves upon conventional generators by adding power management logic and communication abilities that allow for the capture and utilization of the full power generating capacity of generator 12. As will be more fully described below, the present invention essentially adds capabilities to generator 12 to monitor its own power production and various other system parameters and to determine therefrom its present power generating capacity. In other words, the present invention provides intelligence to generator 12 to enable it to determine answers to the questions: "What am I presently doing?" and "What am I capable of doing?" This information is then communicated to at least one intelligent load, which can adjust its consumption based upon the capabilities of generator 12. Thus, electrical system 10 is afforded the opportunity make use of traditionally untapped power capabilities of generator 12. In the embodiment of FIG. 2, these abilities are added to voltage regulator 20, but in alternative embodiments, a separate controller may be added to implement these features.

As described above with reference to FIG. 1, the power generating capacity of generator 12 (i.e., what it can do) is directly affected by the system parameters of generator 12 (i.e., what it is presently doing). For this reason, an important aspect of the present invention is the ability of generator 12 to be aware of its own system parameters. Accordingly, generator 12 includes system sensors 32 for sensing and/or measuring a plurality of system parameters related to the operation of generator 12, such as its ambient temperature, the temperature of its stator, the temperature of its rotor, the power produced by its exciter, the rotational speed of its rotor, or the frequency of its output signal. System sensors 32 may include hardware and/or software that may be contained in a single or multiple devices for sensing, measuring, or otherwise determining these various system parameters. Further, system sensors 32 may be implemented in any of a plurality of conventional methods. Data indicative of these system parameters is then supplied to voltage regulator 20. Thus system sensors 32 include hardware and/or software for determining the voltage provided at, and the current drawn from, the output terminal.

Importantly, these system parameters also include the voltage supplied at the output terminal of generator 12 and the current drawn from the output terminal of generator 12. From these two values, voltage regulator 20 can compute a proxy for the present output power as the product of the voltage supplied at the output of generator 12 and the current drawn from the output of generator 12. While this value does not equal the actual power supplied by generator 12, it does serve as a fair representation of the power supplied. Thus system sensors 32 include hardware and/or software for determining the voltage provided at, and the current drawn from, the output terminal.

Another system parameter that voltage regulator 20 may include information about is the amount of time generator 12 has been operating at a particular output power. As described above, high power outputs can be sustained for a limited time period. Thus, generator 12 may include hardware and/or software for monitoring the length of time generator 12 has supplied a power outside the rated continuous capacity of generator 12.

Voltage regulator 20 evaluates the present output power proxy and the remaining system parameters to determine a present operating point of generator 12. In other words, voltage regulator 20 effectively determines which power-time curve is the appropriate curve, and where on that curve it is. From this information, voltage regulator 20 can determine the present power capacity of generator 12. This power capacity is the maximum power generator 12 can produce based upon the data indicative of output voltage, output current, and system parameters of generator 12. The power capacity of generator 12 may be greater than, less than, or the same as the present power being supplied; but importantly, it may exceed the rated capabilities of generator 12. For example, generator 12 will be able to produce more power on a cold day with prime mover 19 operating at high speeds than on a hot day with prime mover 19 operating at a low speed.

A further aspect of the present invention is use of intelligent loads (i.e., loads having their own controller for controlling their own power consumption) communicatively connected to voltage regular 20 over communications network 44. As shown in FIG. 2, generator 12 provides power to loads 14, 16, and 18. Here, load 14 is a conventional "dumb" load, that is, a load with no intelligence associated therewith. However, loads 16 and 18 are "intelligent loads" in that both include their own controller for controlling distribution of power to their own loads. In particular, load 16 includes load controller 34 and its own load 36, while load 18 includes load controller 38 and its own loads 40 and 42. Load controllers 34 and 38 are each communicably coupled with each other and with voltage regulator 20 of generator 12 via communications network 44. By providing intelligence to both generator 12 and loads 16 and 18, and communicably connecting each of the devices together via communications network 44, the present invention allows for improved distribution of power.

Communications network 44 may be implemented with any communications protocol. For example, communications network 44 may be implemented with a controller area network (CAN), which is one of the ISO standard communications protocols.

Load controllers 34 and 38 receive and convert power delivered to loads 16 and 18 into useful forms for their associated loads. Load controllers 34 and 38 further receive and evaluate the present output power proxy and the power capacity of generator 12 to determine whether to adjust the power consumption of a respective one of loads 16 and 18. Load controllers 34 and 38 of loads 16 and 18 each have a performance set point to which they strive. Load controller 34 and 38 further include sensors (not shown in FIG. 2) for measuring an actual performance of loads 16 and 18. By evaluating how much work it has yet to do to achieve its set point, the quantity of power that generator 12 is presently supplying, and the quantity of power available to it from generator 12, load controllers 34 and 38 can make an intelligent decision about how much power to consume.

For example, load 18 would constitute a large load if it were a vehicular air conditioning system in which load 40 is a compressor motor and load 42 is a compressor fan motor. In this example, the air conditioning controller (load controller 38) can evaluate both a quantity of power that generator 12 can supply and how the air conditioning system (load 18) is performing to determine whether to adjust its consumption. Thus, when the air conditioning system (load 18) is initially turned on to cool a hot space, and where generator 12 has excess capacity (that is, its power capacity exceeds its present power production), air conditioning controller (load controller 38) may prefer to operate the air conditioning system (load 18) at a higher consumption rate until its set point has been met or until generator 12 reduces its capacity. If generator 12 is operating above its capacity (the power capacity is less that its present power production), the air conditioning control (load controller 38) may choose to decrease its power consumption. Thus, rather than running continuously at lower settings, air conditioning system (load 18) may perform its job faster, taking advantage of the additional operating envelope of generator 12 for a period of time.

Load controllers 38 and 34 may also compute their own power consumption by including sensors to measure input voltages to loads 16 and 18 and currents drawn by loads 16 and 18. As with generator 12, load controllers 38 and 34 may compute and rely upon a proxy for the actual power consumed, such as voltage consumed multiplied by current drawn. By knowing their own consumption, load controllers 34 and 38 can evaluate their own operating point to determine their own capacity. Thus, much like generator 12 can operate over its rated continuous capacity, intelligent loads 16 and 18 may be able to operate over their rated continuous consumption levels. This is an improvement over prior art load controllers which evaluate only temperature or current, and shut off the device when either exceeds a predetermined limit. Another advantage to evaluating power consumption is that load controllers 34 and 38 can compare the actual power consumption to estimated power consumption for identification of component wear out, required maintenance, or imminent failure.

Loads 16 and 18 are prioritized within system 10 to prevent each of intelligent loads 16 and 18 from simultaneously grabbing excess power from generator 12 upon generator 12 announcing (broadcasting) its increased capacity. Thus, the load with the lower priority will not have an opportunity to increase its consumption until after the load with a higher priority makes its decision to adjust its consumption.

Load controllers 38 and 34 may also communicate their power consumption proxy with each other and with generator 12 over communication network 44 to allow for a more intelligent distribution of power. In this way, each of generator 12 and intelligent loads 16 and 18 can act in the best interest of electrical system 10, rather than operating in a vacuum where each is concerned only about its own performance. Such communication may also allow for dynamic assignment of load priorities. For instance, if load 16 is assigned a higher priority and is closer to achieving its set point than load 18, generator 12 may reassign priorities to result in an improved system performance.

By enabling load controllers 38 and 34 to communicate with voltage regulator 20, load controllers 38 and 34 can make requests of voltage regulator 20 to adjust the power provided to it. For example, if load controller 38 realizes that load 16 could use additional power to best meet its set point, but also aware that load 16 cannot tolerate any increase in current, load controller 38 may broadcast a request to voltage regulator 20 of generator 12 to "trim," or temporarily increase, its output voltage—the resultant effect being an increase in power without an increase in current.

Electrical system 10 can further be improved by adding "intelligence", or a controller, to prime mover 19 which causes rotation of the rotor of generator 12. This can be helpful in allowing prime mover 19 to control the electrical power generation load on it when needed. For instance, where prime mover 19 is an engine in a vehicle, and the vehicle is required to accelerate, as when the vehicle is attempting to pass in traffic or climb a hill, prime mover 19 can communicate a request to voltage regulator 20 of generator 12 to reduce power consumption. Voltage regulator 20 can respond to this request by reducing the output voltage of generator 12, thus reducing its generated power and its load on prime mover 19. Alternatively, prime mover 19 may request that the power generated by generator 12 be diverted from electrical system 10 to an alternative system of loads, such as a transmission system of the vehicle.

Voltage regulator 20 cannot control consumption by its loads. If intelligent loads 16 and 18 do not respond to requests by voltage regulator 20 to reduce their consumption, voltage regulator 20 can force a reduced power by lowering its output voltage. Because power is the product of the output voltage and the output current, this action results in a reduction in the power produced by generator 12.

In sum, the present invention is an electrical power generator that makes its full power capacity available for consumption by at least one intelligent load coupled to its output. The generator includes self-monitoring abilities that enable it to determine a present output power of the generator (i.e., what it is presently doing) and, from that, a power capacity of the generator (i.e., what it can do). These values are then broadcast to the intelligent loads via a communications network for use by the intelligent loads in controlling their own consumption.

Although the present invention has been described with reference to preferred embodiments, workers skilled in the art will recognize that changes may be made in form and detail without departing from the spirit and scope of the invention.

The invention claimed is:

1. An electrical system comprising:
   a plurality of variable loads;
   an electrical power generator that provides power to the variable loads via an output terminal;
   a plurality of system sensors that sense a plurality of generator parameters related to the operation of the generator, the generator parameters including a voltage at the output terminal of the generator and a current drawn from the output terminal of the generator;
   a generator controller that is coupled to the plurality of system sensors for receipt of data indicative of the plurality of generator parameters and that determines therefrom a present generator output power proxy and a generator power capacity; and
   at least one load controller that is communicably coupled to the generator controller for receipt of data indicative of the present generator output power proxy and the generator power capacity and that controls a power consumption of at least one of the variable loads as a function the present generator output power proxy and the generator power capacity.

2. The electrical system of claim 1 wherein the generator parameters further comprise at least one parameter selected from the group consisting of ambient temperature, stator temperature, rotor temperature, rotor speed, and output signal frequency.

3. The electrical system of claim 1 wherein the generator parameters further comprise an amount of time the generator has been caused to operate outside of its rated continuous capacity.

4. The electrical system of claim 1 wherein the at least one load controller comprises a plurality of load controllers communicably coupled to each other and to the generator controller via a communications network.

5. The electrical system of claim 4 wherein each load controller evaluates a performance set point of its load, a measured performance of its load, a present power consumed proxy of its load, a power consumption capacity of its load, the present generator output power proxy, and the generator power capacity in determining the power consumption of its load.

6. The electrical system of claim 5 wherein each load controller communicates the present power consumption of its load and the power consumption capacity of its load to both the other load controllers and the generator controller via the communications network.

7. The electrical system of claim 4 wherein the generator controller is responsive to a request from one of the load controllers to adjust the output voltage of the generator.

8. The electrical system of claim 4 wherein the load controllers have priority values associated therewith for determining an order in which the load controllers determine the power consumption of their load.

9. The electrical system of claim 1 and further comprising:
   a prime mover that provides a rotational energy to the generator for conversion by the generator into electrical power; and
   a prime mover controller that controls a rotation of the prime mover and that is communicably coupled to the generator controller via a communications network, wherein the generator controller is responsive to requests from the prime mover controller to adjust a power generation load of the generator on the prime mover.

* * * * *

UNITED STATES PATENT AND TRADEMARK OFFICE
CERTIFICATE OF CORRECTION

| | | |
|---|---|---|
| PATENT NO. | : 7,592,784 B2 | Page 1 of 1 |
| APPLICATION NO. | : 12/237244 | |
| DATED | : September 22, 2009 | |
| INVENTOR(S) | : Wei Wei Qi, Michael Rubbo and Richard Wainwright | |

It is certified that error appears in the above-identified patent and that said Letters Patent is hereby corrected as shown below:

On the Title Page, Item (56) FOREIGN PATENT DOCUMENTS, the reference number reading "0013287" should read --200013287--.

Signed and Sealed this
First Day of March, 2011

David J. Kappos
*Director of the United States Patent and Trademark Office*